(12) United States Patent
Kim et al.

(10) Patent No.: US 12,253,885 B2
(45) Date of Patent: Mar. 18, 2025

(54) ELECTRONIC DEVICE INCLUDING FLEXIBLE DISPLAY

(71) Applicant: Samsung Electronics Co., Ltd., Gyeonggi-do (KR)

(72) Inventors: Jonghae Kim, Gyeonggi-do (KR); Joungmin Cho, Gyeonggi-do (KR); Sungdae Choi, Gyeonggi-do (KR); Kwangtai Kim, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 17/527,313

(22) Filed: Nov. 16, 2021

(65) Prior Publication Data

US 2022/0182477 A1    Jun. 9, 2022

Related U.S. Application Data

(63) Continuation of application No. PCT/KR2021/016546, filed on Nov. 12, 2021.

(30) Foreign Application Priority Data

Dec. 4, 2020 (KR) .......................... 10-2020-0168777
Jan. 18, 2021 (KR) .......................... 10-2021-0006641

(51) Int. Cl.
*G06F 1/16* (2006.01)
*H04M 1/02* (2006.01)

(52) U.S. Cl.
CPC .......... *G06F 1/1652* (2013.01); *G06F 1/1624* (2013.01); *G06F 1/1683* (2013.01);
(Continued)

(58) Field of Classification Search
CPC .... G06F 1/1624; G06F 1/1652; G06F 1/1683; H04M 1/0237; H04M 1/0268
See application file for complete search history.

(56) References Cited

U.S. PATENT DOCUMENTS 9,535,522 B2 *  1/2017 Ahn ...................... H10K 59/873
10,496,136 B2    12/2019 Kim et al.
(Continued)

FOREIGN PATENT DOCUMENTS

JP      2017097345 A  *  6/2017  ........... G04G 17/045
KR   10-2016-0108720 A     9/2016
(Continued)

OTHER PUBLICATIONS

Written Opinion dated Feb. 18, 2022.

*Primary Examiner* — Nidhi Thaker
(74) *Attorney, Agent, or Firm* — Cha & Reiter, LLC

(57) ABSTRACT

An electronic device and flexible display are disclosed. The electronic device includes a first housing defining an inner space, a second housing slidably coupled to the first housing, and the flexible display. The flexible display includes a protection layer, a display panel laminated on at least a portion of the protection layer, a first portion at least partially connected to the first housing and visible from an exterior of the electronic device when disposed in a retracted state, a second portion extending from the first portion and at least partially retracted into the inner space so as to be invisible from the exterior, and an extension extending from the display panel, the extension disposed in a region corresponding to the second portion, having a control circuit disposed thereon, and disposed to be supported by the protection layer.

11 Claims, 20 Drawing Sheets

(52) U.S. Cl.
CPC ....... *H04M 1/0237* (2013.01); *H04M 1/0268* (2013.01); *G06F 1/1616* (2013.01); *G06F 1/1681* (2013.01); *H04M 1/0216* (2013.01)

(56) References Cited

U.S. PATENT DOCUMENTS

| | | | | |
|---|---|---|---|---|
| 10,868,264 | B2* | 12/2020 | Shin | ........................ H10K 59/65 |
| 11,329,263 | B2* | 5/2022 | Park | ........................ G06F 1/1652 |
| 11,515,367 | B2 | 11/2022 | Wei et al. | |
| 11,841,745 | B2* | 12/2023 | Baek | ........................ G06F 3/0412 |
| 2014/0217382 | A1 | 8/2014 | Kwon et al. | |
| 2014/0240933 | A1* | 8/2014 | Lee | ........................ G06F 1/1656 |
| | | | | 29/831 |
| 2014/0307396 | A1* | 10/2014 | Lee | .................... G02F 1/133305 |
| | | | | 29/830 |
| 2016/0179229 | A1 | 6/2016 | Ahn | |
| 2016/0260915 | A1* | 9/2016 | Park | ........................ H10K 77/111 |
| 2018/0059727 | A1 | 3/2018 | Seo et al. | |
| 2018/0077808 | A1* | 3/2018 | Seo | ........................ G06F 3/04164 |
| 2019/0268455 | A1* | 8/2019 | Baek | ........................ G06F 3/0412 |
| 2019/0305237 | A1 | 10/2019 | Shin et al. | |
| 2020/0020255 | A1 | 1/2020 | Yoon | |
| 2020/0341576 | A1* | 10/2020 | Kahng | .................... G06F 3/0412 |
| 2020/0371558 | A1 | 11/2020 | Kim et al. | |
| 2021/0240294 | A1 | 8/2021 | Ko et al. | |

FOREIGN PATENT DOCUMENTS

| | | |
|---|---|---|
| KR | 10-2017-0083276 A1 | 7/2017 |
| KR | 10-1796813 B1 | 11/2017 |
| KR | 10-2018-0025358 A | 3/2018 |
| KR | 10-2019-0086305 A1 | 7/2019 |
| KR | 10-2001822 B1 | 7/2019 |
| KR | 10-2019-0113128 A | 10/2019 |
| KR | 10-2019-0124009 A | 11/2019 |
| KR | 10-2020-0007366 A1 | 1/2020 |
| KR | 10-2020-0064573 A | 6/2020 |
| KR | 20220059794 A * | 5/2022 |

* cited by examiner

ELECTRONIC DEVICE INCLUDING FLEXIBLE DISPLAY

CROSS-REFERENCE TO RELATED APPLICATION(S)

This application is a continuation of International Application No. PCT/KR2021/016546, filed on Nov. 12, 2021, which claims priority to Korean Patent Application No. 10-2020-0168777, filed on Dec. 4, 2020 and Korean Patent Application No. 10-2021-0006641, filed on Jan. 18, 2021 in the Korean Intellectual Property Office, the disclosures of which are herein incorporated by reference.

TECHNICAL FIELD

Certain embodiments of the disclosure relate to an electronic device including a flexible display.

Background Art

Certain types of electronic devices (such as smartphones) are gradually becoming slimmer, and have been improved to enhance design aspects, and better differentiate functional elements thereof. Accordingly, these electronic devices have evolved from simple quadrangular shapes to other various shapes. One such electronic device may have a deformable structure, such that a larger-display can be provided without sacrificing portability. In one example of such a deformable structure, an electronic device may be equipped with a structure (such as, for example, a rollable or slidable structure) having housings that are slidable with respect to one another, which allows variation in the available display area of a flexible display. Such an electronic device may benefit from smooth operation in configuring the flexible display, when the display area changes based on a structural change in a configuration of the housing.

Technical Problem

Electronic devices may include a deformable slidable electronic device (such as, for example, a rollable electronic device), the display area of which can be expanded. The slidable electronic device may include a first housing (such as, for example, base housing, base bracket, or base structure) and a second housing (such as, for example, sliding housing, sliding bracket, or sliding structure) which may be at least partially fitted together and coupled, such that they can move relative to one other. For example, the first housing and the second housing may be operable so as to slide relative to each other, and may support least a portion of a flexible display (or expandable display) such that, in a retracted state (e.g., "slide-in" or partly housed), the flexible display is configured to have a first display area and, in a extended state (e.g., "slide-out"), the flexible display is configured to have a second display area larger than the first display area.

A slidable electronic device may include multiple electronic components disposed in the inner space. The electronic components occupy different mounting spaces, and thus may be appropriately disposed in the inner space of housings, so that the sliding operation does not cause physical or operational interference. For example, a flexible display may include a protective layer (such as, for example, window layer), a display panel laminated on the protective layer, and an auxiliary material layer (such as, for example, polymer layer, metal sheet layer, and/or digitizer) disposed beneath the display panel. In order to contain a control circuit (for example, display driver IC or "DDI"), a flexible display may include an extension portion (such as, for example, bending portion) extending outwards from the display panel and a display substrate (such as, for example, display flexible printed circuit board or "FPCB") electrically connected to the extension portion. The extension portion and the display substrate may thus be bent and attached to a back surface of the flexible display.

The extension portion of the slidable electronic device may be disposed so as to avoid interference with the variable portion of the flexible display during the sliding operation, but other electronic components (such as, for example, a camera module, sensor module, interface connector port, socket device, and/or microphone device) may also be disposed in the avoidance area. According, a difficulty is presented in that it is often unavoidable to arrange certain components through the variable portion, thereby posing a possibility that the some may be damaged by a collision with peripheral structures during the sliding operation. In addition, due to the extension portion and the display substrate being folded onto the back surface of the flexible display, the corresponding section cannot be utilized as the active area of the flexible display.

SUMMARY

Certain embodiments may provide an electronic device including a flexible display having a robust structure capable of protecting a control circuit.

Certain embodiments may provide an electronic device including a flexible display having a reduced unnecessary dummy area of the flexible display and having an increased expansion area.

Certain embodiments may provide an electronic device including a flexible display having a reduced display panel attachment area, thereby contributing to manufacturing cost reduction.

According to certain embodiments, an electronic device may include a first housing defining an inner space, a second housing slidably coupled to the first housing, and a flexible display, which includes: a protection layer, a display panel laminated on at least a portion of the protection layer, a first portion at least partially connected to the first housing and visible from an exterior of the electronic device when disposed in a retracted state, a second portion extending from the first portion and at least partially retracted into the inner space so as to be invisible from the exterior, and an extension extending from the display panel, the extension disposed in a region corresponding to the second portion, having a control circuit disposed thereon, and disposed to be supported by the protection layer.

According to certain embodiments, a flexible display may include a protection layer, a display panel laminated on at least a portion of the protection layer, and an extension extending from the display panel and having a control circuit disposed thereon, wherein the extension is disposed so as to be supported by the protection layer.

An electronic device according to an example embodiment of the disclosure may include a structure in which an extension portion including a control circuit and/or a display substrate are disposed on a protective layer (such as, for example, window layer), thereby reducing any unnecessary allocation of the dummy area, and thereby increasing the expansion area of the flexible display. In addition, the display panel attachment area may be reduced in size, thereby reducing manufacturing cost.

Various other advantageous effects inferred directly or indirectly through this document may be provided.

BRIEF DESCRIPTION OF DRAWINGS

In connection with the description of the drawings the same or similar reference numerals may be used for the same or similar components.

DETAILED DESCRIPTION

Figure 1:
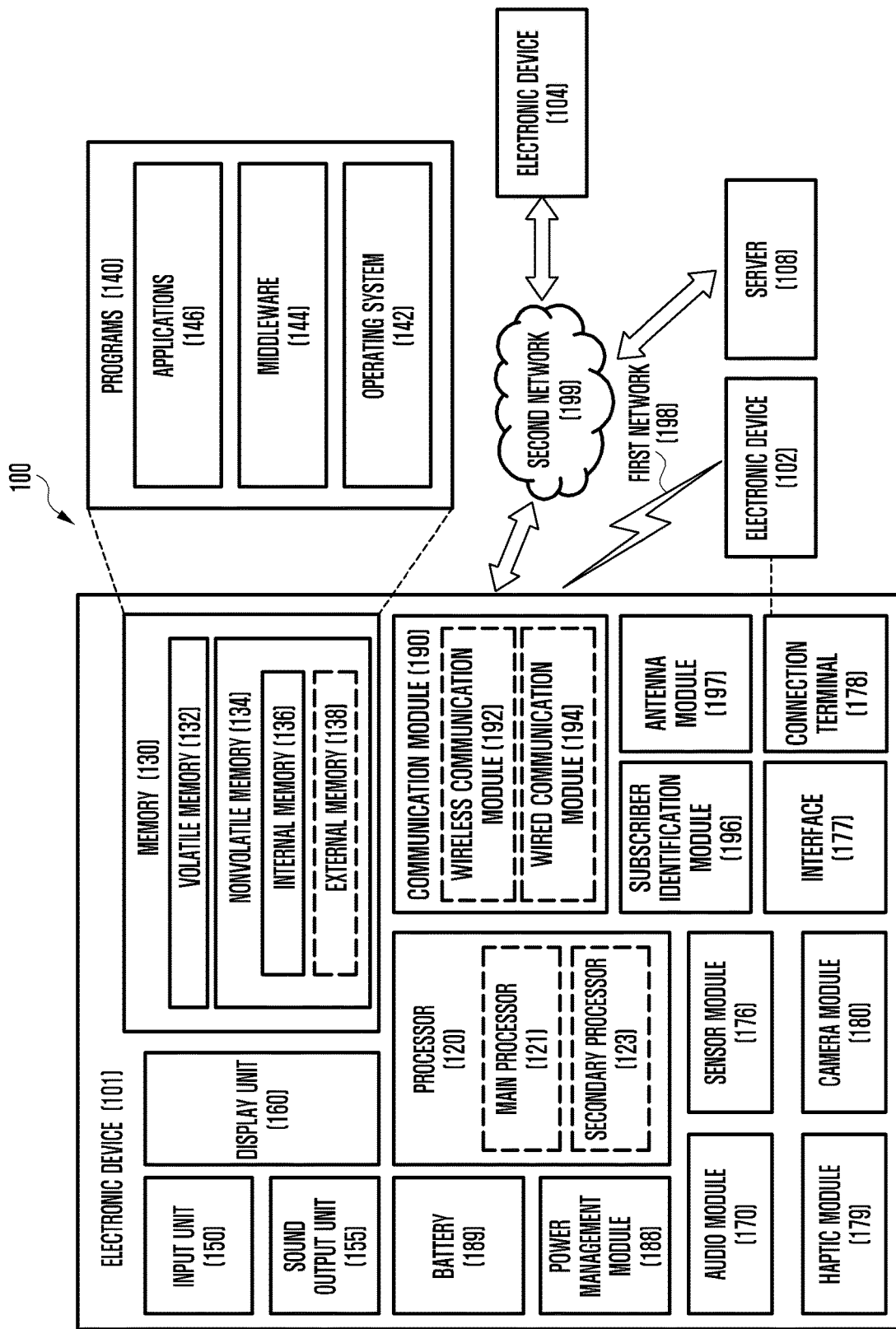
FIG. 1 is a block diagram of an electronic device in a network environment according to certain embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
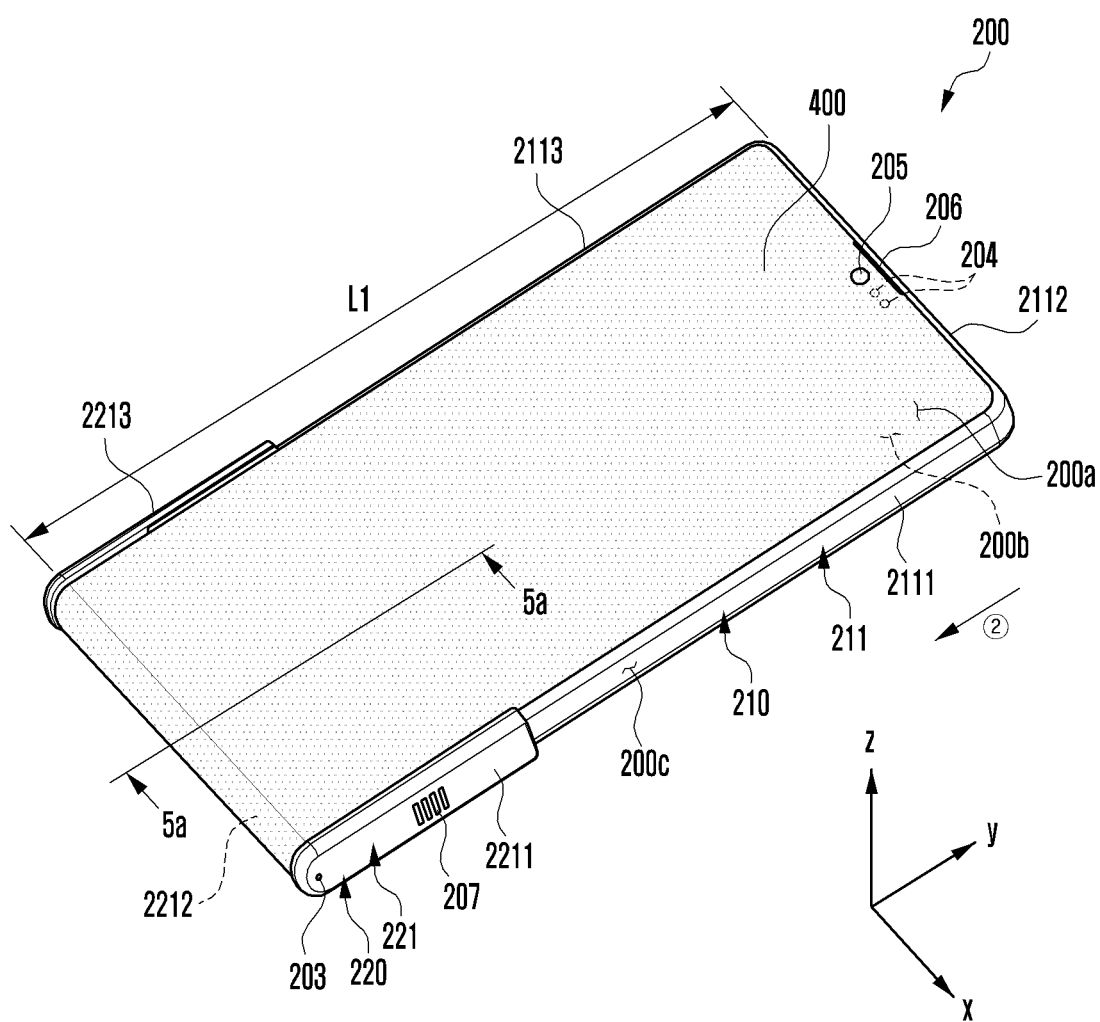
FIG. 2A is a perspective view of an electronic device in a slide-in state according to certain embodiments of the disclosure.
Figure 2B:
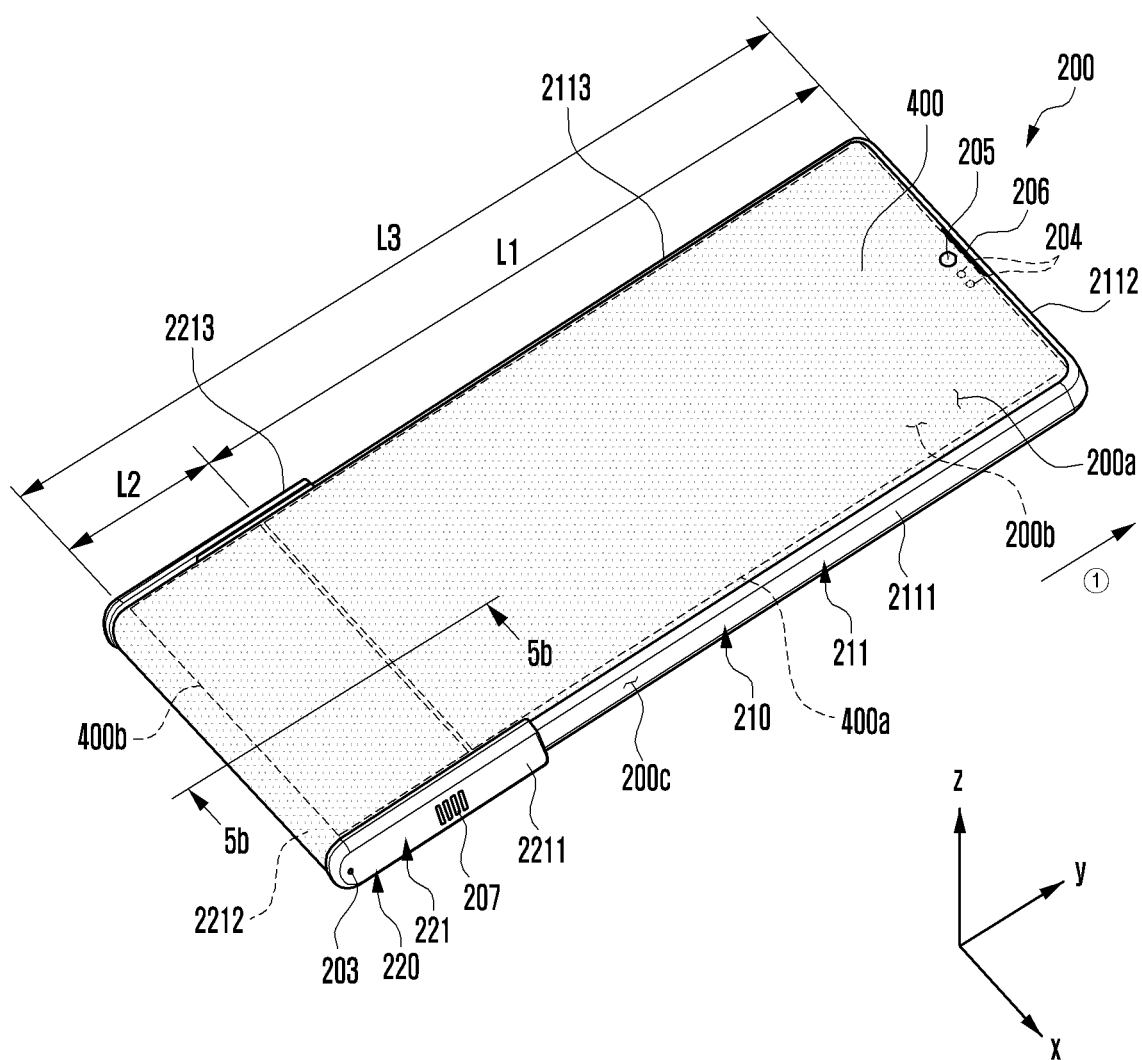
FIG. 2B is a perspective view of an electronic device in a slide-out state according to certain embodiments of the disclosure.

FIG. 2A is a perspective view of an electronic device in a retracted or slide-in state according to certain embodiments of the disclosure, and FIG. 2B is a perspective view of an electronic device in a slide-out state according to certain embodiments of the disclosure.

An electronic device 200 of FIGS. 2A and 2B may be at least partially similar to the electronic device 101 of FIG. 1, or may further include other embodiments of an electronic device.

Referring to FIGS. 2A and 2B, the electronic device 200 may include a first housing 210, a second housing 220 coupled to the first housing so as to be movable from the first housing 210 by a predetermined reciprocating distance in a predetermined direction, and a flexible display 400 (e.g., an expandable display) disposed to be supported through at least a portion of the second housing 220 and the first housing 210. According to an embodiment, when disposed in a slide-out state, the electronic device 200 may include a bendable member or a bendable support member (e.g., the bendable member 240 of FIG. 3) (e.g., articulated hinge module) which at least partially forms substantially the same plane as at least a portion of the first housing 210, and is at least partially accommodated in the inner space (e.g., the inner space 2101 of FIG. 5A) of the electronic device 200 in a slide-in state. According to an embodiment, at least a portion of the flexible display 400 may be invisible from the outside (e.g., the exterior environment of the electronic device) when set in the slide-in state by disposition within the inner space (e.g., the inner space 2101 of FIG. 5A) of the electronic device 200, while being supported by the bendable member (e.g., the bendable member 240 of FIG. 3). According to an embodiment, at least a portion of the flexible display 400 may be visible from the outside in the slide-out state while supported by the bendable member (e.g., the bendable member 240 of FIG. 3), such that the extended portion of the flexible display forms at least partially the same plane as the first housing 210.

According to certain embodiments, the electronic device 200 may include a front surface 200a (e.g., first surface), a rear surface 200b (e.g., second surface) facing a direction opposite to a direction of the front surface 200a, and a side surface 200c surrounding a space between the front surface 200a and the rear surfaces 200b. According to an embodiment, the electronic device 200 may include a first housing 210 including a first side member 211, and a second housing 220 including a second side member 221. According to an embodiment, the first side member 211 may include a first side surface 2111 having a first length oriented in a predetermined direction (e.g., y axis direction), a second side surface 2112 extending from the first side surface 2111 oriented in another predetermined direction (e.g., −x axis direction) substantially perpendicular thereto, so as to have a second length shorter than the first length, and a third side surface 2113 extending from the second side surface 2112 to be substantially parallel to the first side surface 2111 and having the first length matching the first side surface 2111. According to an embodiment, the first side member 211 may be at least partially formed of a conductive material (e.g., metal). According to an embodiment, at least a portion of the first side member 211 may include at least one conductive portion segmented through at least one segmented portion (e.g., non-conductive portion). According to an embodiment, at least one conductive portion may be electrically connected to a wireless communication circuit (e.g., the wireless communication module 192 of FIG. 1) to be used as an antenna, which may operate in a predetermined frequency band (e.g., legacy band or sub-6 band).

According to certain embodiments, the second side member 221 may include a fourth side surface 2211 at least partially corresponding to the first side surface 2111 and having a third length, a fifth side surface 2212 extending from the fourth side surface 2211 in a direction substantially parallel to the second side surface 2112 and having a fourth length longer than the third length, and a sixth side surface 2213 extending from the fifth side surface 2212 to correspond to the third side surface 2113 and having the third length. According to an embodiment, the second side member 221 may be at least partially formed of a conductive material (e.g., metal). According to an embodiment, at least a portion of the second side member 221 may include at least one conductive portion segmented through at least one segmented portion (e.g., non-conductive portion). According to an embodiment, at least one conductive portion may be electrically connected to a wireless communication circuit (e.g., the wireless communication module 192 of FIG. 1) to be used as an antenna operating in a predetermined frequency band (e.g., legacy band or sub-6 band).

According to certain embodiments, the first side surface 2111 and the third side surface 2113 may be slidably coupled to the fourth side surface 2211 and the sixth side surface 2213, respectively. According to an embodiment, in the slide-in state, at least a portion of the first side surface 2111 may overlap at least a portion of the fourth side surface 2211, so that the remaining portion of the first side surface 2111 may be visible from the outside. According to an embodiment, in the slide-in state, at least a portion of the third side surface 2113 may overlap at least a portion of the sixth side surface 2213, so that the remaining portion of the third side surface 2113 may be visible from the outside.

According to certain embodiments, the electronic device 200 may include a flexible display 400 which is disposed to be supported by at least a portion of the second housing 220 and the first housing 210. According to an embodiment, the flexible display 400 may include a first portion 400a (e.g., flat portion) which is visible from the outside, and a second portion 400b (e.g., bendable portion) extending from the first portion 400a and introduced into the inner space (e.g., the inner space 2101 of FIG. 5A) of the electronic device 200 to be invisible from the outside in the slide-in state. According to an embodiment, the first portion 400a may be disposed to be supported by the first housing 210, and the second portion 400b may be disposed to be supported by at least a portion of the bendable member (e.g., the bendable member 240 of FIG. 3). According to an embodiment, in a state in which the first housing 210 is slid out from the second housing 220 in a predetermined direction (i.e., direction ① of FIG. 2B), the flexible display 400 may at least partially extend via extraction of the second portion 400b while being supported by the bendable member (e.g., the bendable member 240 of FIG. 3), in which second portion 400b may form substantially the same plane as the first portion 400a, and may be disposed to be visible from the outside. According to an embodiment, in a state in which the first housing 210 is slid into the second housing 220 along a predetermined direction (direction ②), the second portion 400b of the flexible display 400 may be retracted into the inner space (e.g., the inner space 2101 of FIG. 5A) of the electronic device 200, causing it to be invisible from the outside. Accordingly, a display area of the flexible display 400 may vary as the first housing 210 slides along a predetermined direction.

According to certain embodiments, the first housing 210 and the second housing 220 may be operated with respect to each other in a sliding manner so that the overall length is variable. According to an embodiment, the electronic device 200 in the slide-in state may be configured to have a first length (L1) from the second side surface 2112 to the fifth side surface 2212. According to an embodiment, in the slide-out state, a portion of the bendable member (e.g., the bendable member 240 of FIG. 3) inserted into the inner space (e.g., the inner space 2101 of FIG. 5A) of the electronic device 200 may be movable to form an additional second length (L2), and thus, the electronic device 200 may be configured to have a third length (L3) longer than the first length (L1). For example, the flexible display 400 may have a display area substantially corresponding to the first length (L1) in the slide-in state, and an expanded display area substantially corresponding to the third length (L3) in the slide-out state.

According to certain embodiments, the operation of sliding out the electronic device 200 may be performed via user manipulation. For example, the electronic device 200 may be transitioned to the slide-out state from the slide-in state when a user moves the outer surface of the flexible display 400 in a predetermined direction (direction ①). In an embodiment, the first housing 210 may also be slid out in a predetermined first direction (e.g., direction ①) through manipulation of a locking mechanism (not shown) exposed through the rear surface 200b of the electronic device 200. In an embodiment, the first housing 210 may be automatically operated through a driving mechanism (e.g., driving motor, decelerating module and/or gear assembly) disposed in the inner space (e.g., the inner space 2101 of FIG. 5A) of the first housing 210 and/or the inner space of the second housing 220. According to an embodiment, the electronic device 200 may be configured such that the operation of the first housing 210 is controlled through the driving mechanism when an event for changing the slide-in/slide-out state of the electronic device 200 is detected through the processor (e.g., the processor 120 of FIG. 1). In an embodiment, the processor (e.g., the processor 120 of FIG. 1) of the electronic device 200 may control the flexible display 400 such that an object is displayed and an application program is executed, in response to detecting a change in the display area of the flexible display 400 according to a slide-in state, a slide-out state, or an intermediate state (e.g., including a free-stop state).

According to certain embodiments, the electronic device 200 may include at least one of an input device 203, sound devices 206 and 207, at least one sensor module 204, at least one camera module 205, a connector port (not shown), a key input device (not shown), or an indicator (not shown), which are disposed in the inner space (e.g., the inner space 2101 of FIG. 5A) of the first housing 210 and/or the inner space of the second housing 220. In another embodiment, the electronic device 200 may be configured such that at least one of the above-described elements is omitted or other elements are additionally included.

According to certain embodiments, the input device 203 may include a microphone. In an embodiment, the input device 203 may include a plurality of microphones arranged to sense the direction of sound. The sound devices 206 and 207 may include a speaker. The sound devices 206 and 207 may include a call receiver 206 and an external speaker 207. According to an embodiment, the external speaker 207 may be disposed in the second housing 220 or the inner space of the second housing 210. According to an embodiment, the call receiver 206 may also include a speaker (e.g., piezo speaker) operated without a separate speaker hole.

According to certain embodiments, the at least one sensor module 204 may generate an electrical signal or data value corresponding to an internal operating state or an external environmental state of the electronic device 200. According to an embodiment, the at least one sensor module 204 may be arranged to detect the external environment through, for example, at least a portion of the flexible display 400. In an embodiment, the electronic device 200 may further include at least one additional sensor module disposed to detect the external environment through the rear surface 200b. According to an embodiment, the sensor module 204 may include at least one of a proximity sensor, an illuminance sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, and a humidity sensor.

According to certain embodiments, the at least one camera module 205 may include one or a plurality of lenses, an image sensor, and/or an image signal processor. According to an embodiment, the at least one camera module 205 may be disposed under the flexible display 400 and may be configured to photograph a subject through a portion of an active area of the flexible display 400. For example, the at least one camera module 205 or the at least one sensor module 204 may be disposed in the inner space of the electronic device 200 so as to communicate with the external environment through a transmission region or an opening formed by perforating the flexible display 400. According to an embodiment, a region of the flexible display 400, facing the at least one camera module 205, as a part of a region for displaying content, may also be formed as a transmission region having a predetermined transmittance. According to an embodiment, the transmission region may be formed to have a transmittance in the range of about 5% to about 20%. This transmission region may include a region overlapping with an effective region (e.g., region of field of view) of the at least one camera module 205, through which light for generating an image formed by an image sensor passes. For example, the transmission region of the flexible display 400 may include a region having a pixel density and/or a wiring density lower than the periphery thereof. For example, the transmission region may replace the above-described opening. For example, the at least one camera module 205 may include an under display camera (UDC). In an embodiment, the at least one sensor module 204 may also be arranged in the inner space of the electronic device 200 to perform a function thereof without being visually exposed through the flexible display 400. In an embodiment, the electronic device 200 may further include at least one additional camera module disposed to photograph an external subject through the rear surface 200b.

Figure 3:
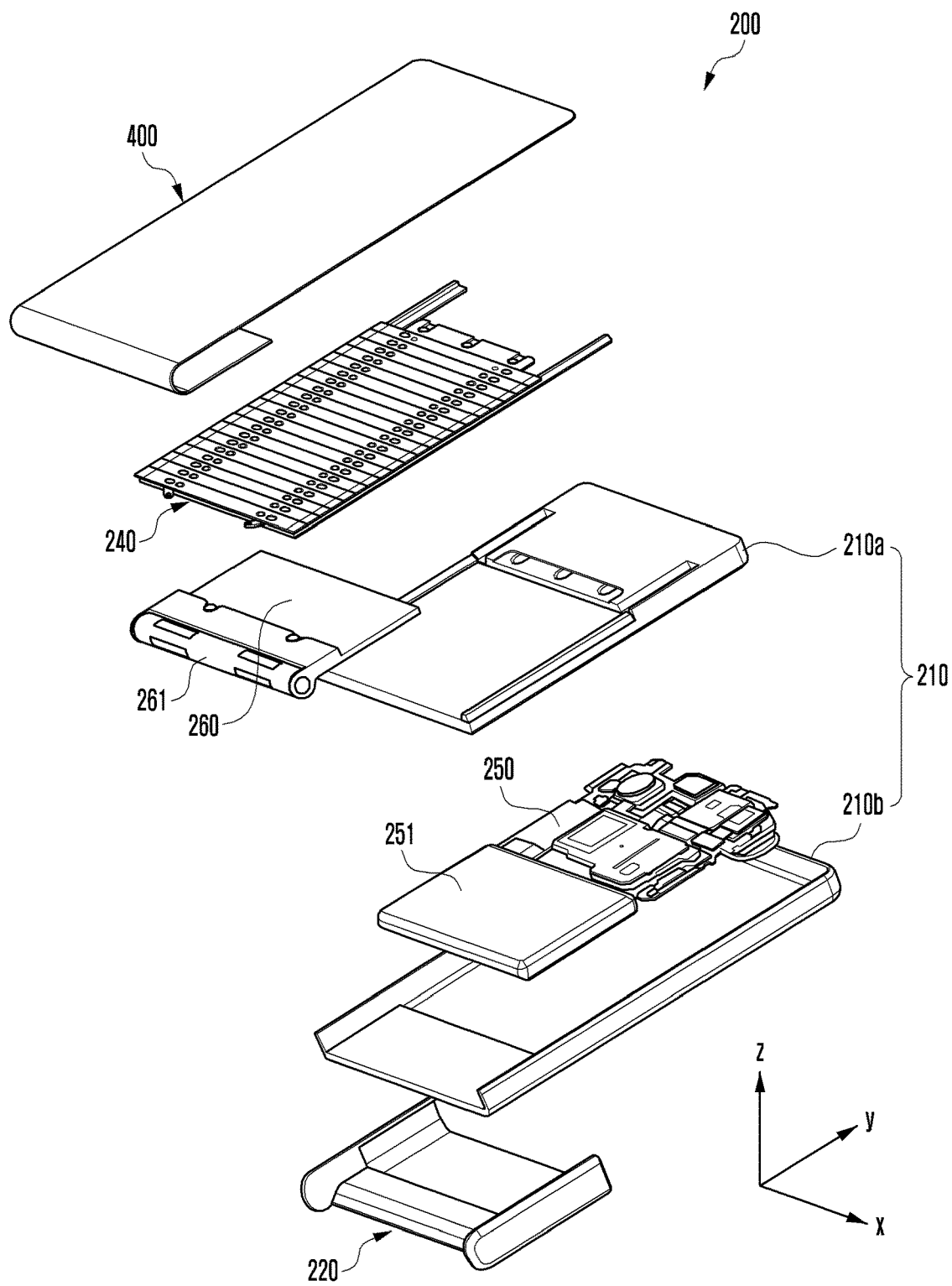
FIG. 3 is an exploded perspective view of an electronic device according to certain embodiments of the disclosure.

FIG. 3 is an exploded perspective view of an electronic device according to certain embodiments of the disclosure.

Referring to FIG. 3, the electronic device 200 may include a first housing 210, a second housing 220 slidably coupled to the first housing 210, a bendable member 240 connected to the first housing 210 and disposed to be at least partially rotatable according to the movement of the first housing 210 (e.g., by curling around the supporting member 261), and a flexible display 400 disposed to be supported by at least a portion of the bendable member 240 and the first housing 210. According to an embodiment, the first housing 210 may be configured by coupling a first bracket housing 210a and a second bracket housing 210b. According to an embodiment, the first housing 210 may include an inner space (e.g., the inner space 2101 in FIG. 5A) provided through the coupling structure of the first bracket housing 210a and the second bracket housing 210b. According to an embodiment, the electronic device 200 may include a main substrate 250 disposed in the inner space (e.g., the inner space 2101 of FIG. 5A) of the first housing 210. According to an embodiment, the electronic device 200 may include a camera module (e.g., the camera module 205 of FIGS. 2A and 2B) or a sensor module (e.g., the sensor module 204 of FIGS. 2A and 2B) disposed on the substrate 250 in the inner space (e.g., the inner space 2101 of FIG. 5A). According to an embodiment, the electronic device 200 may include at least one battery 251 disposed near the main substrate 250 or at least partially overlapping the main substrate 250, as disposed in the inner space (e.g., the inner space 2101 of FIG. 5A). According to an embodiment, the bendable member 240 may be disposed such that one end thereof is fixed to the first bracket housing 210a and the other end thereof is accommodated to be at least partially rotatable in the inner space (e.g., the inner space 2101 of FIG. 5A) of the first housing 210. For example, the bendable member 240 may be at least partially accommodated in the inner space (e.g., the inner space 2101 of FIG. 5A) in the slide-in state and may be at least partially slid out to substantially form or at least parallel the plane as the first housing 210 in the slide-out state. Accordingly, the display area of the flexible display 400 supported by the first housing 210 and the bendable member 240 may vary according to the sliding operation. In an embodiment, the other end of the bendable member 240 may be at least partially received in the inner space of the second housing 220 in the slide-in state.

According to certain embodiments, the electronic device 200 may include a support structure coupled to the second housing 220 and arranged to support the bendable member 240. In an embodiment, the support structure may include a support plate 260 coupled to the first housing 210, and a supporting member 261 coupled to the support plate 260. According to an embodiment, the supporting member 261 may have a curved outer surface in order to induce the bendable member 240 to curl around itself and thus be smoothly retracted into the inner space (e.g., the inner space 2101 of FIG. 5A). In an embodiment, the supporting member 261 may include a support shaft rotatably disposed in the support plate 260.

Figure 4:
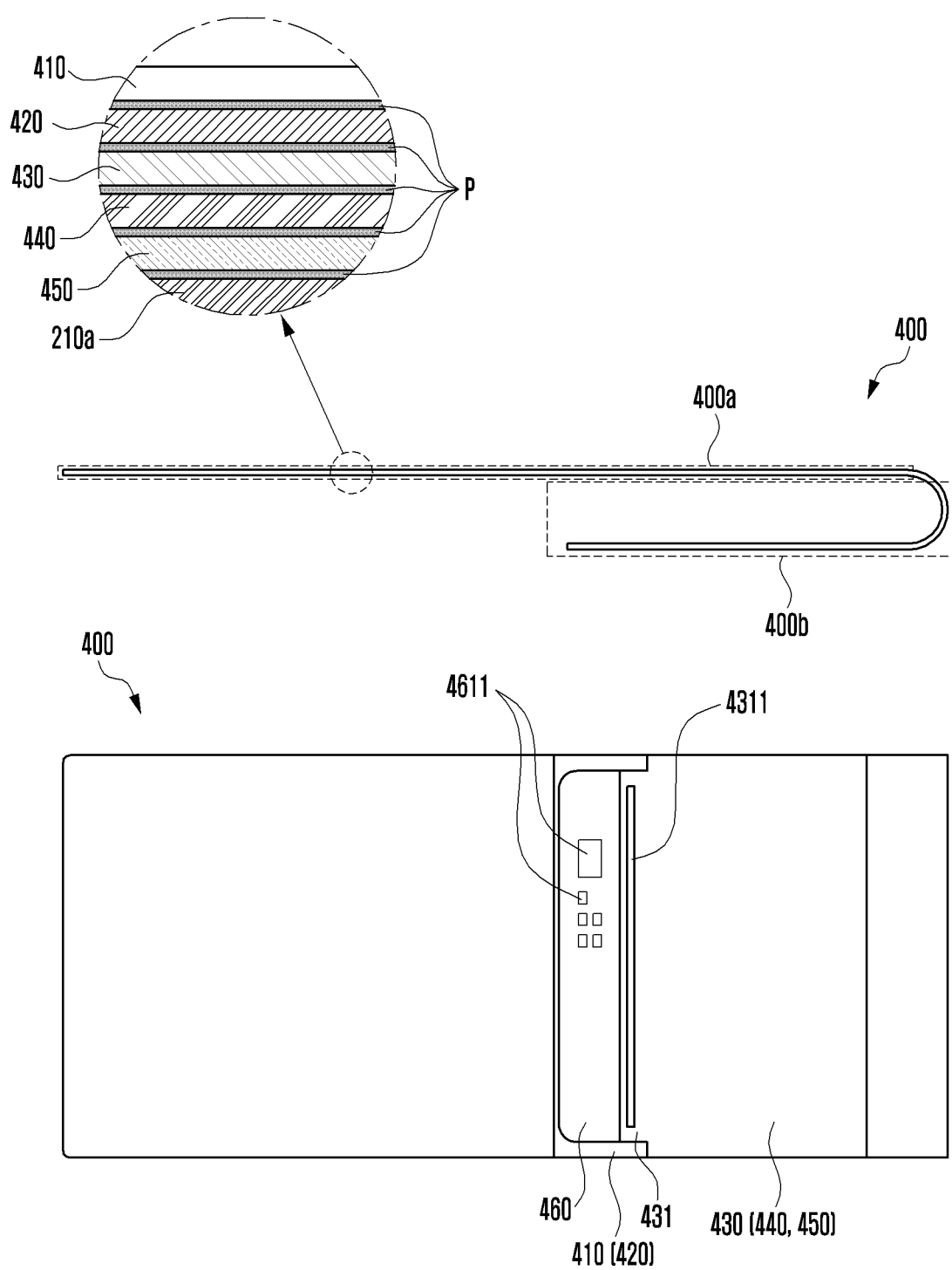
FIG. 4 is a block diagram of a flexible display according to certain embodiments of the disclosure.

FIG. 4 is a block diagram of a flexible display according to certain embodiments of the disclosure.

Referring to FIG. 4, the flexible display 400 may include a first portion 400a arranged to be visible from the outside in the slide-in state, and a second portion 400b extending from the first portion 400a and accommodated in the inner space (e.g., the inner space 2101 of FIG. 5A) of the electronic device 200, disposed to be at least partially invisible from the outside in the slide-in state. According to an embodiment, at least a portion of the second portion 400b may be maintained to be received in the inner space (e.g., the inner space 2101 of FIG. 5A) so as to be invisible from the outside in the slide-out state.

According to certain embodiments, the flexible display 400 may include a protection layer 410 (e.g., window layer), and a polarizing ("POL" or "polarizer") layer 420 (e.g., polarizing film), a display panel 430, a polymer member 440, and a metal sheet layer 450, which are sequentially disposed on the protection layer 410. According to an embodiment, the protection layer 410 may include a polymer layer and/or a glass layer laminated on the polymer layer. According to an embodiment, the protection layer 410 may include polyethylene terephthalate (PET) or polyimide (PI) as a polymer layer and may include ultra-thin glass (UTG) as a glass layer. In an embodiment, the polarizing layer 420 may function as the protection layer 410.

According to certain embodiments, the protection layer 410, the polarizing layer 420, the display panel 430, the polymer member 440, and the metal sheet layer 450 may be attached to each other through an adhesive (P). For example, the adhesive (P) may include at least one of an optical clear adhesive (OCA), a pressure sensitive adhesive (PSA), a heat-reactive adhesive, a general adhesive, and a double-sided tape. According to an embodiment, the flexible display 400 may be attached to the first housing 210 and the bendable member 240 through another adhesive member. In an embodiment, the polarizing layer 420 may be replaced with a color filter and a black matrix (BM) formed on at least a portion of the display panel 430.

According to certain embodiments, the polymer member 440 may include a dark color (e.g., black) applied thereto and thus may advantageously display the same dark color background when the display is deactivated. According to an embodiment, the polymer member 440 may act as a cushion to prevent damage to the flexible display 400 by absorbing an impact from the outside of the electronic device 200. In an embodiment, the polymer member 440 may be disposed under the metal sheet layer 450.

According to certain embodiments, the metal sheet layer 450 may advantageously reinforce the rigidity of the electronic device 200, provide shielding against ambient noise and interference, dissipate heat emitted from a heat dissipating component disposed in the periphery thereof, and maintain a degree of flexibility to the flexible display. According to an embodiment, the metal sheet layer 450 may include at least one of steel use stainless (SUS) (e.g., stainless steel "STS"), Cu, Al, or CLAD (e.g., laminated member including SUS and Al arranged alternately). In another embodiment, the metal sheet layer 450 may include other alloy materials. According to an embodiment, the metal sheet layer 450 may be disposed in a region facing at least a portion of the second portion 400b of the flexible display 400, so as to include a pattern having a plurality of openings capable of providing flexibility to the flexible display 400. According to an embodiment, the bending characteristic of the flexible display 400 may be determined through a shape or arrangement structure of the plurality of openings. In an embodiment, the flexible display 400 may further include a detection member (not shown) for detecting an input by an electromagnetic induction-type writing member. According to an embodiment, the detection member may include a digitizer. According to an embodiment, the detection member may be disposed between the display panel 430 and the at least one polymer member 440. In another embodiment, the detection member may be disposed under the metal sheet layer 450, and the metal sheet layer 450 may include certain structures (e.g., a plurality of openings) that enable the detection member to detect a signal (e.g., a resonance frequency) of an electronic pen. In another embodiment, the detection member may be disposed on the metal sheet layer 450 between the first housing 210 and the bendable member 240.

According to certain embodiments, the flexible display 400 may also include at least one functional member (not shown) disposed between the polymer member 440 and the metal sheet layer 450. According to an embodiment, the functional member may include a graphite sheet for dissipating heat, a force touch FPCB, a fingerprint sensor FPCB, an antenna radiator for communication, a heat dissipation sheet, a conductive/non-conductive tape, and/or an open cell sponge.

According to certain embodiments, the flexible display 400 may include an extension 431 extending from the display panel 430, having a predetermined width and length. According to an embodiment, the extension 431, which includes a region formed by extension of the wiring structure of the display panel 430, may include a control circuit 4311 (e.g., display driver IC "DDI") for controlling the driving of the flexible display 400. According to an embodiment, the flexible display 400 may include a display substrate 460 (e.g., flexible printed circuit "FPCB") electrically connected to the extension 431 and including at least one electric element 4611. According to an embodiment, the at least one electric element 4611 may include at least one of a touch IC, a display flash memory, an ESD preventing diode, a pressure sensor, or a passive element such as a decap.

According to an example embodiment of the disclosure, the extension 431 extending from the display panel 430 may not be folded to the rear surface of the flexible display 400 and may be disposed on the protection layer 410 (e.g., window layer) by lamination. In an embodiment, the display substrate 460 electrically connected to the extension 431 may also be attached to the protection layer 410. The arrangement structure of the extension 431 may enable the active area of the display panel 430 to be better utilized when the slidable electronic device 200 (e.g., rollable electronic device) is slid out, and may prevent collision with a structure disposed in the periphery thereof, thereby advantageously reducing malfunction of the flexible display 400.

Figure 5A:
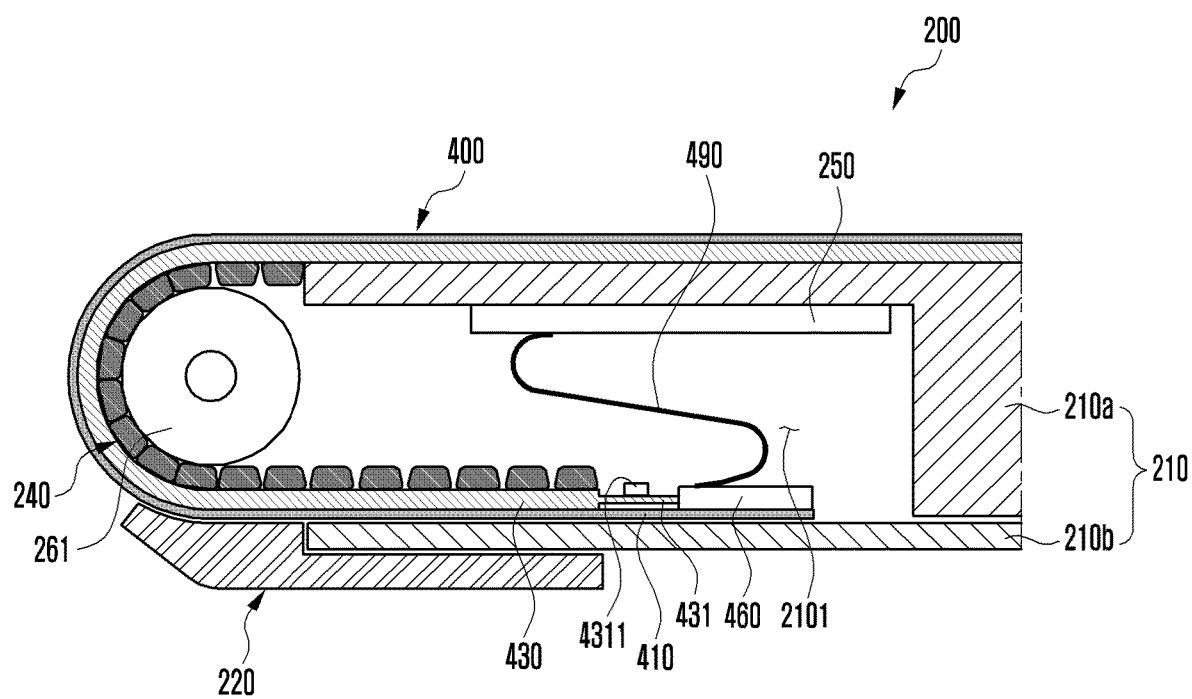
FIG. 5A is a partial cross-sectional view of an electronic device taken along line 5a-5a of FIG. 2A according to certain embodiments of the disclosure.
Figure 5B:
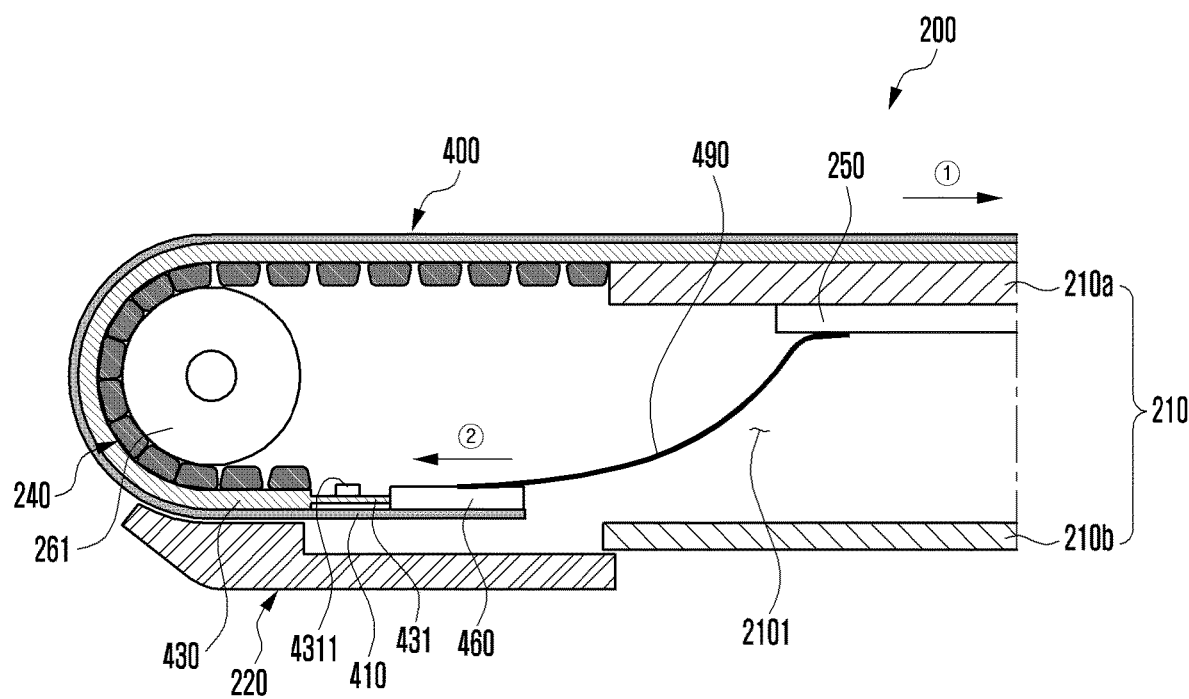
FIG. 5B is a partial cross-sectional view of an electronic device taken along line 5b-5b of FIG. 2B according to certain embodiments of the disclosure.

FIG. 5A is a partial cross-sectional view of an electronic device taken along line 5a-5a of FIG. 2A according to certain embodiments of the disclosure, and FIG. 5B is a partial cross-sectional view of an electronic device taken along line 5b-5b of FIG. 2B according to certain embodiments of the disclosure.

Referring to FIGS. 5A and 5B, the electronic device 200 may include a first housing 210, a second housing 220 slidably coupled to the first housing 210, a bendable member 240 connected to the first housing 210 and at least partially slid into the inner space 2101 (e.g., the internal space 2101 of the first housing 210) of the electronic device 200 in the slide-in state, and a flexible display 400 disposed to be supported by at least a portion of the bendable member 240 and the first housing 210. According to an embodiment, in the slide-in state, the flexible display 400 may be accommodated in the inner space 2101 of the electronic device 200 while being at least partially supported by the bendable member 240, so as to be invisible from the outside. According to an embodiment, the flexible display 400 may be supported by the bendable member 240 in the slide-out state and may be slid out such that the portion accommodated in the inner space 2101 is at least partially visible from the outside.

According to certain embodiments, the flexible display 400 may include a protection layer 410, and a display panel 430 laminated on the protection layer 410. According to an embodiment, the flexible display 400 may include an extension 431 extending from the display panel 430 and including a control circuit 4311 disposed thereon, and a display substrate 460 electrically connected to the extension 431. According to an embodiment, the control circuit 4311 may be disposed on the extension 431 to face the inner space 2101. In an embodiment, the control circuit 4311 may be disposed on the extension 431 to face the protection layer 410 when positioned between the extension 431 and the protection layer 410. According to an embodiment, the extension 431 and the display substrate 460 may be disposed to be laminated on at least a portion of the protection layer 410. According to an embodiment, the extension 431 and the display substrate 460 may be disposed to be attached to the protection layer 410 through an adhesive member. According to an embodiment, the protection layer 410 may include at least one of a polymer layer, a glass layer, and a polarizing layer. According to an embodiment, the electronic device 200 may include a main substrate 250 disposed in the inner space 2101. According to an embodiment, the display substrate 460 may be electrically connected to the main substrate 250 through the flexible FPCB 490. According to an embodiment, the flexible FPCB 490 may be formed to have elasticity and/or length capable of accommodating a movement occurring when transitioning the electronic device 200 from the slide-in state to the slide-out state. According to an embodiment, the main substrate 250 may be disposed on at least one additional bracket (e.g., front housing or an intermediate bracket) disposed in the inner space 2101 of the housing 210.

According to certain embodiments, when the electronic device 200 is transitioned from the slide-in state to the slide-out state by the first housing 210 moving in a predetermined first direction (direction ①), at least a portion of the flexible display 400, accommodated in the inner space 2101, may be moved in a second direction (direction ②) opposite to the first direction (direction ①). For example, the extension 431 laminated on the protection layer 410 and extending from the display panel 430 and the display substrate 460 electrically connected to the extension 431 may also move together in the second direction (direction ②). According to an embodiment, even during the transition from the slide-in state to the slide-out state, the electrical connection structure between the flexible display 400 and the main substrate 250 may be maintained through the flexible FPCB 490.

According to an example embodiment of the disclosure, since the extension 431 extending from the display panel 430 has no region where the same is folded to the rear surface of the flexible display 400, the flexible display 400 may use, as an active area thereof, a region occurring just before a region from which the extension 431 of the display panel 430 starts, thereby reducing the manufacturing cost of the flexible display 400 through the exclusion of unnecessary dummy regions and advantageously slimming the electronic device 200 due to the lowered laminate height.

Figure 6A:
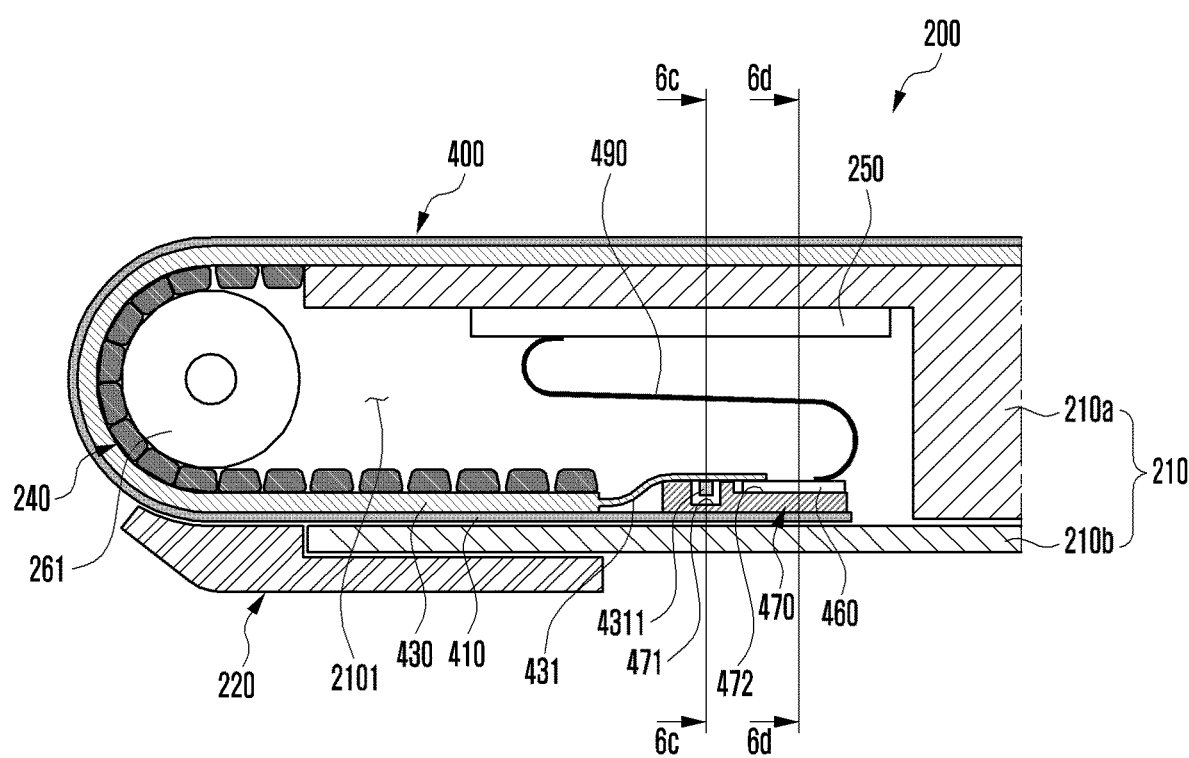
FIGS. 6A and 6B are partial cross-sectional views of an electronic device in a slide-in state and a slide-out state according to certain embodiments of the disclosure.
Figure 6B:
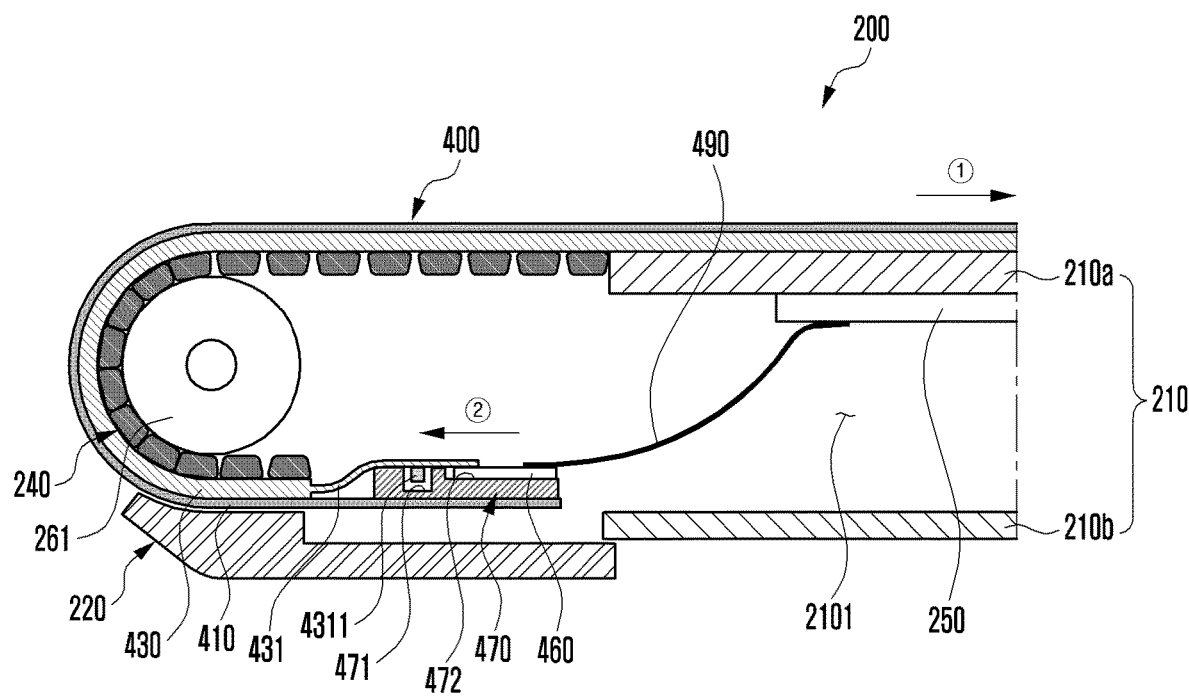

FIGS. 6A and 6B are partial cross-sectional views of an electronic device in a slide-in state and a slide-out state according to certain embodiments of the disclosure.

In the description of the electronic device 200 of FIGS. 6A and 6B, the same reference numerals are assigned to the components substantially the same as those of the electronic device 200 illustrated in FIGS. 5A and 5B, and detailed descriptions thereof may be omitted.

Referring to FIGS. 6A and 6B, the display substrate 460 and at least a portion of the extension 431 extending from the display panel 430 may be disposed to be supported through a support member 470 disposed on the protection layer 410. According to an embodiment, the support member 470 may be formed of a polymer or a metal material. According to an embodiment, the support member 470 may be attached to the protection layer 410 through an attachment method, such as bonding and/or taping. According to an embodiment, the control circuit 4311 may be disposed on a surface of the extension 431 facing the protection layer 410, and may be received in a recess 471 formed lower than the outer surface of the support member 470. In an embodiment, the support member 470 may further include a cushioning member (e.g., the cushioning member 4711 of FIG. 6C), such as a sponge or Poron, disposed in the recess 471 to protect the control circuit 4311 from external impact. Accordingly, the support member 470 may provide robust protection for the control circuit 4311 from external impact. According to an embodiment, the display substrate 460 may be fixed to the outer surface of the support member 470 through an attachment method, such as bonding and/or taping. In an embodiment, the support member 470 may include a stepped portion 472 formed lower than the outer surface thereof to receive the display substrate 460 so as to advantageously reduce the overall laminate thickness.

Figure 6C:
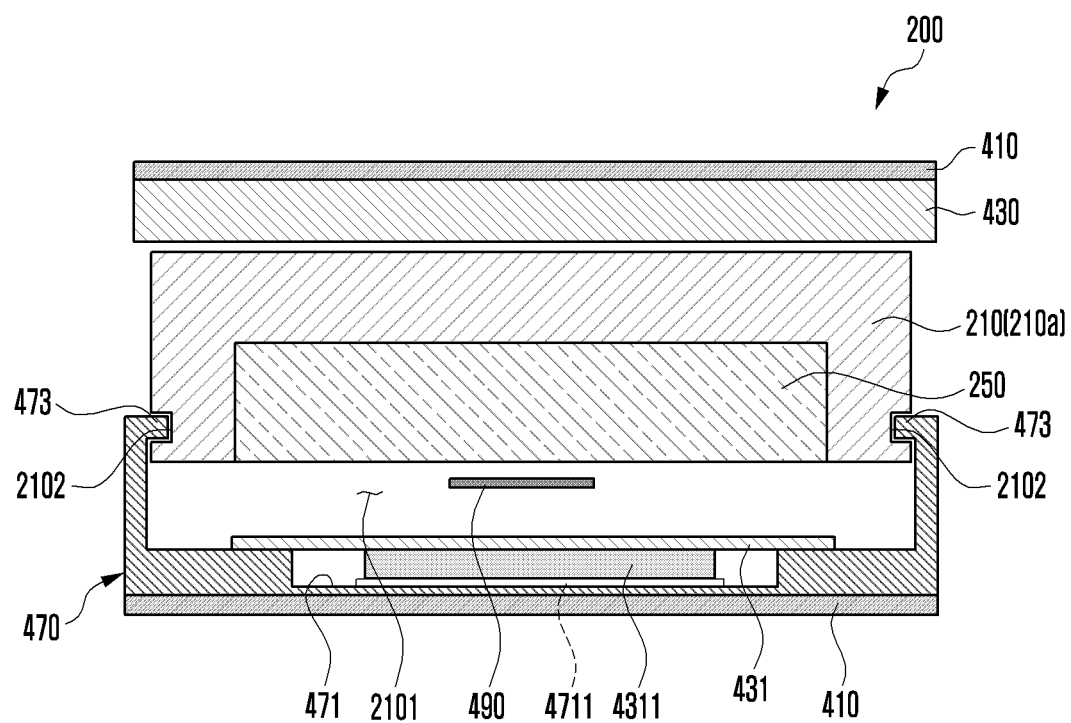
FIG. 6C is a partial cross-sectional view of an electronic device taken along line 6c-6c of FIG. 6A according to certain embodiments of the disclosure.
Figure 6D:
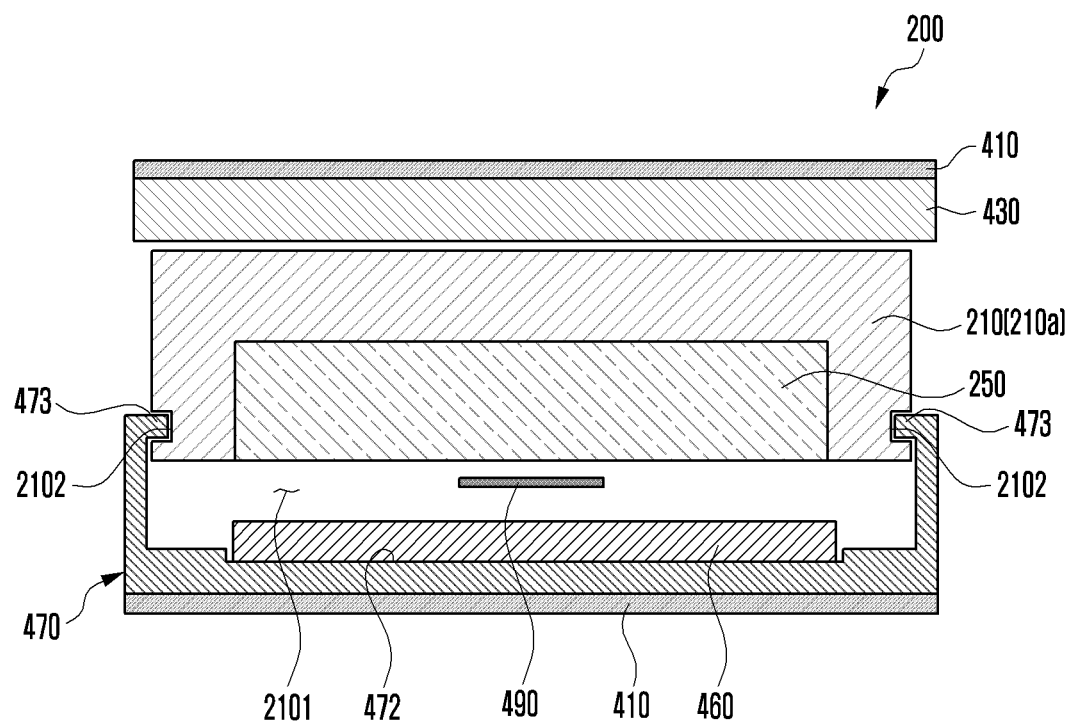
FIG. 6D is a partial cross-sectional view of an electronic device taken along line 6d-6d of FIG. 6C according to certain embodiments of the disclosure.

FIG. 6C is a partial cross-sectional view of an electronic device taken along line 6c-6c of FIG. 6A according to certain embodiments of the disclosure. FIG. 6D is a partial cross-sectional view of an electronic device taken along line 6d-6d of FIG. 6C according to certain embodiments of the disclosure.

Referring to FIGS. 6C and 6D, the electronic device 200 may include a guide structure for inducing a smooth operation of the support member 470 during the sliding operation, so as to prevent the protection layer 410 from contacting the inner surface of the first housing 210. According to an embodiment, the guide structure may include at least one guide rail 473 protruding from the support member 470, and a guide slit 2102 formed in a region corresponding to the first housing 210 (e.g., the first bracket housing 210a) to guide the guide rail 473. According to an embodiment, the guide rail 473 may extend toward the first housing 210 from each of the opposite side surfaces of the support member 470. Accordingly, the protection layer 410 of the flexible display 400 may move according to the sliding operation while spaced apart from the inner surface of the first housing 210, through the guide structure (e.g., the guide rail 473 and/or the guide slit 2102) of the support member 470 and the first housing 210, thereby preventing damage due to friction.

Figure 7A:
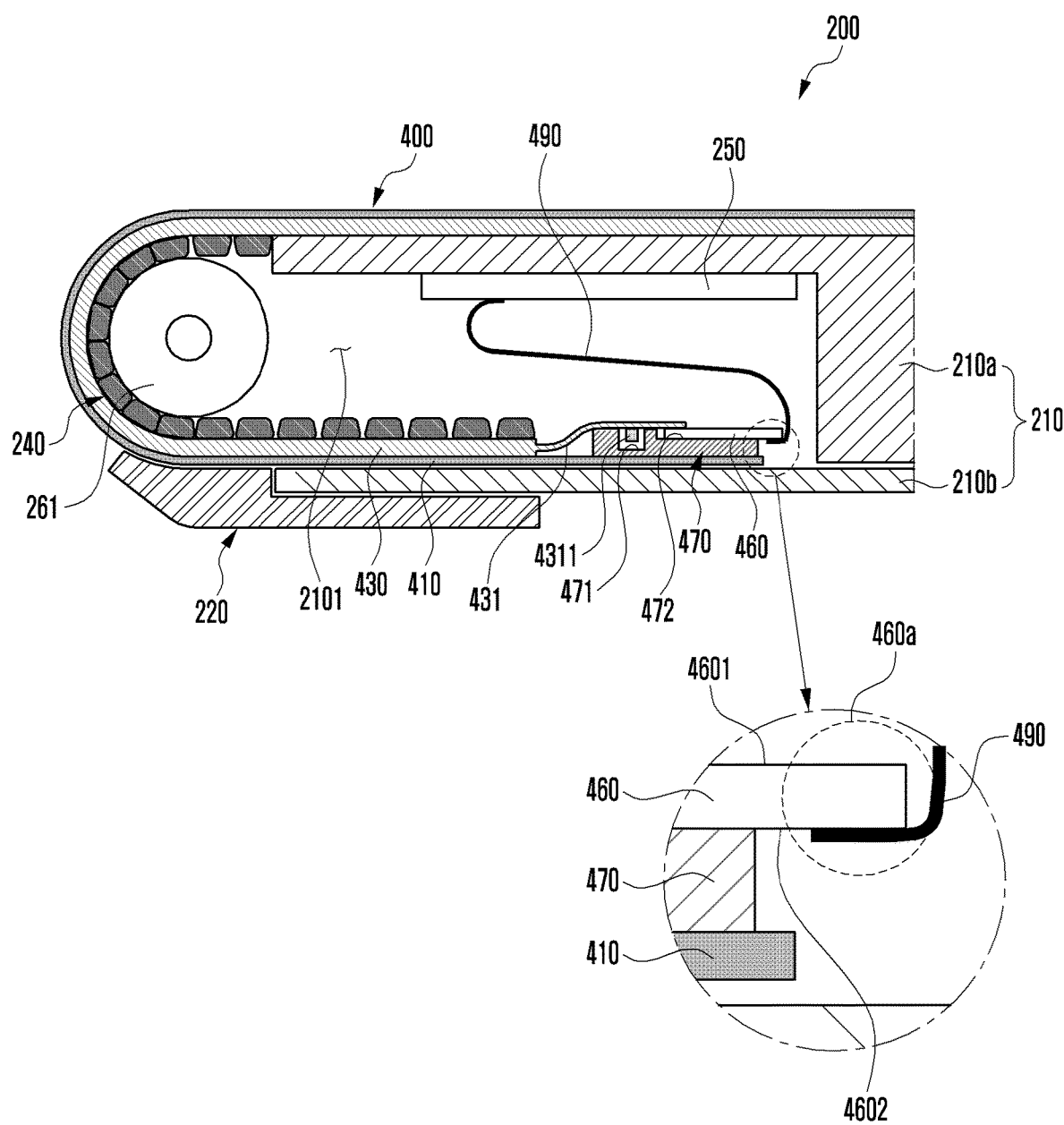
FIGS. 7A and 7B are partial cross-sectional views of an electronic device in a slide-in state and a slide-out state according to certain embodiments of the disclosure.
Figure 7B:
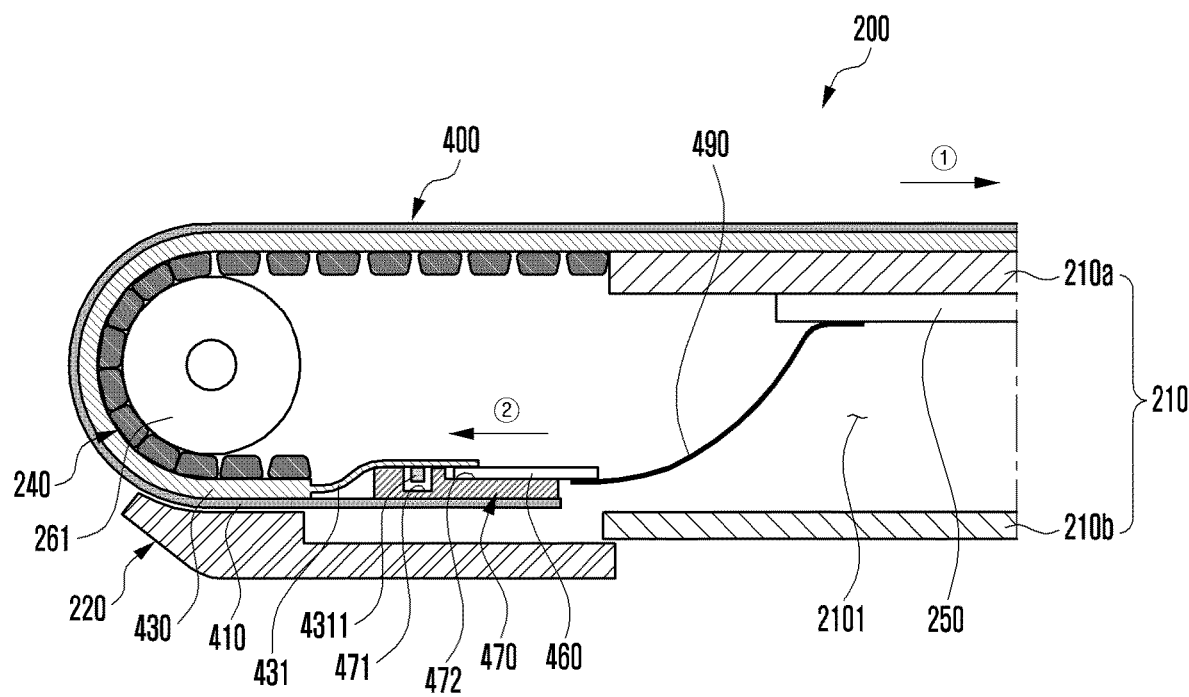

FIGS. 7A and 7B are partial cross-sectional views of an electronic device in a slide-in state and a slide-out state according to certain embodiments of the disclosure.

In the description of the electronic device 200 of FIGS. 7A and 7B, the same reference numerals are assigned to the components substantially the same as those of the electronic device 200 illustrated in FIGS. 6A and 6B, and detailed descriptions thereof may be omitted.

Referring to FIGS. 7A and 7B, the display substrate 460 may include a protruding region 460a at least partially protruding further than the support member 470. For example, the display substrate 460 may include a first surface 4601 facing the inner space 2101, and a second surface 4602 facing the protection layer 410. According to an embodiment, the second surface 4602 of the display substrate 460, except for the protruding region 460a, may be attached to the outer surface of the support member 470. In this case, the flexible FPCB 490 may be in contact with at least a portion of the second surface 4602 of the display substrate 460. For example, the connector of the flexible FPCB 490 may be disposed on the second surface 4602 when positioned between the display substrate 460 and the protection layer 410, thereby advantageously providing a space for efficiently mounting an electrical component of the main substrate 250.

Figure 8A:
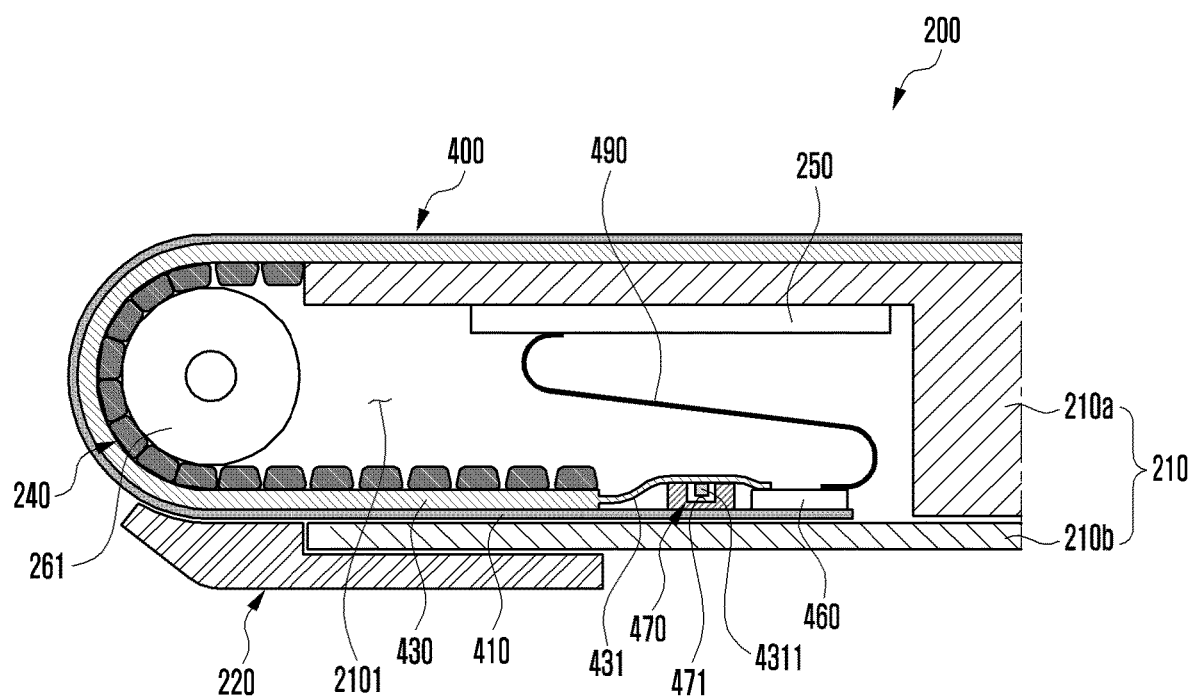
FIGS. 8A and 8B are partial cross-sectional views of an electronic device in a slide-in state and a slide-out state according to certain embodiments of the disclosure.
Figure 8B:
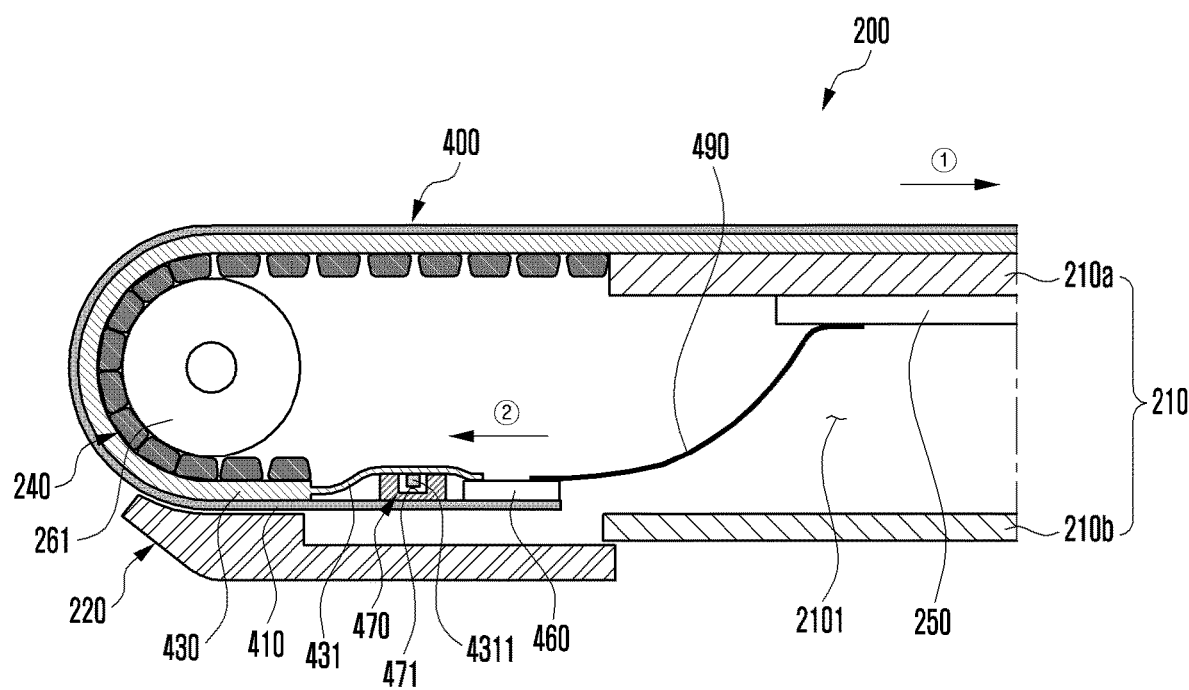

FIGS. 8A and 8B are partial cross-sectional views of an electronic device in a slide-in state and a slide-out state according to certain embodiments of the disclosure.

In the description of the electronic device 200 of FIGS. 8A and 8B, the same reference numerals are assigned to the components substantially the same as those of the electronic device 200 illustrated in FIGS. 6A and 6B, and detailed descriptions thereof may be omitted.

Referring to FIGS. 8A and 8B, the support member 470 may be disposed on the protection layer 410 to support the control circuit 4311. For example, the support member 470 may be disposed under the extension 431 and between the display panel 430 and the display substrate 460. For example, at least a portion of the extension 431 may be attached to the outer surface of the support member 470, and the control circuit 4311 may be received in the recess 471 of the support member 470, formed lower than the outer surface thereof. In an embodiment, the display substrate 460 may be directly attached to at least a portion of the protection layer 410.

Figure 9A:
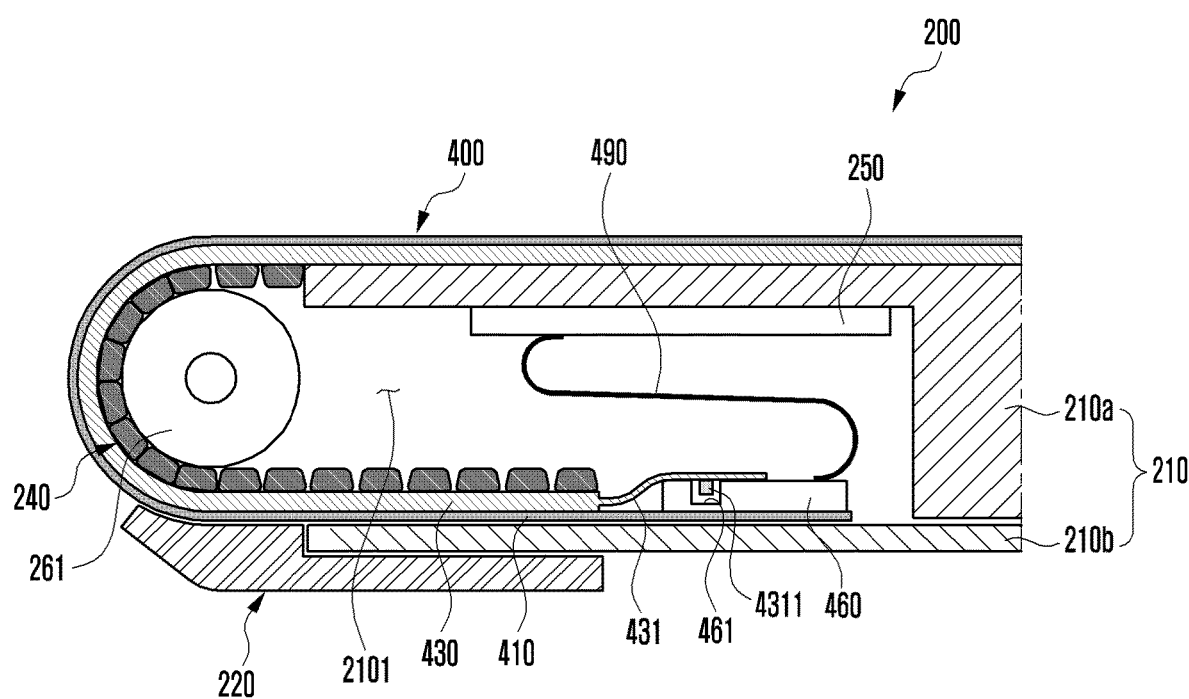
FIGS. 9A and 9B are partial cross-sectional views of an electronic device in a slide-in state and a slide-out state according to certain embodiments of the disclosure.
Figure 9B:
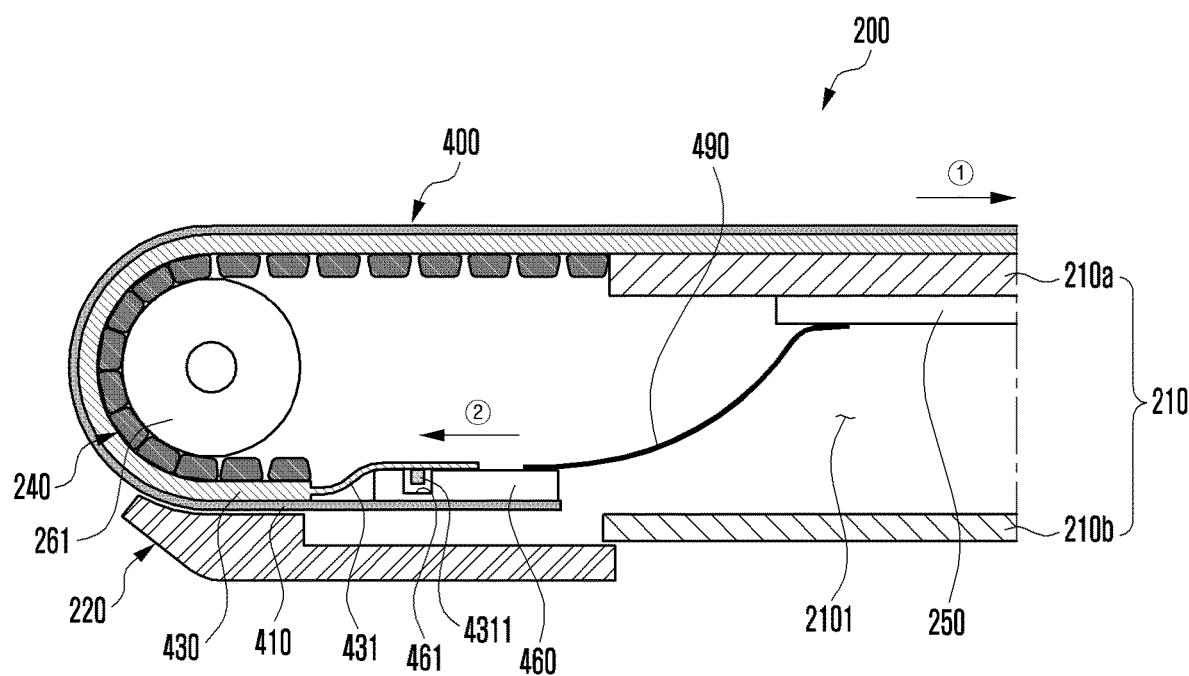

FIGS. 9A and 9B are partial cross-sectional views of an electronic device in a slide-in state and a slide-out state according to certain embodiments of the disclosure.

In the description of the electronic device 200 of FIGS. 9A and 9B, the same reference numerals are assigned to the components substantially the same as those of the electronic device 200 illustrated in FIGS. 5A and 5B, and detailed descriptions thereof may be omitted.

Referring to FIGS. 9A and 9B, at least a portion of the extension 431 extending from the display panel 430 may be electrically connected to at least a portion of the display substrate 460 disposed on the protection layer 410. According to an embodiment, the control circuit 4311 may be received in a recess 461 formed lower than the outer surface of the display substrate 460. In this case, the display substrate 460 may include a rigid printed circuit board (PCB).

Figure 10A:
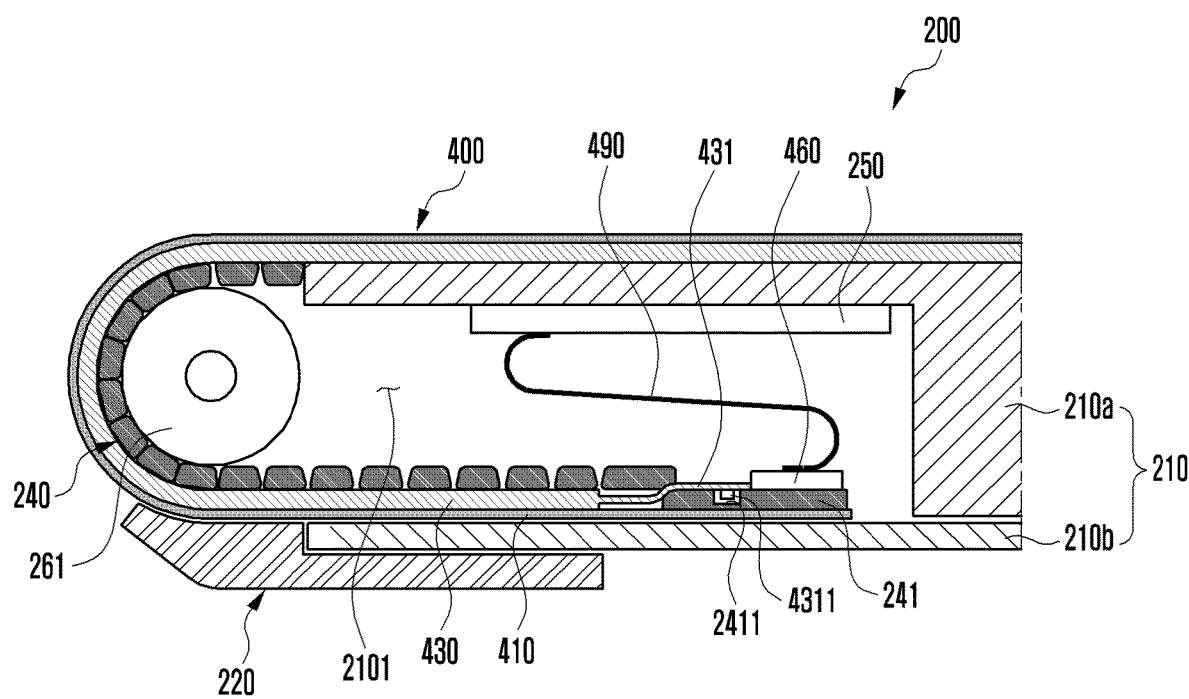
FIGS. 10A and 10B are partial cross-sectional views of an electronic device in a slide-in state and a slide-out state according to certain embodiments of the disclosure.
Figure 10B:
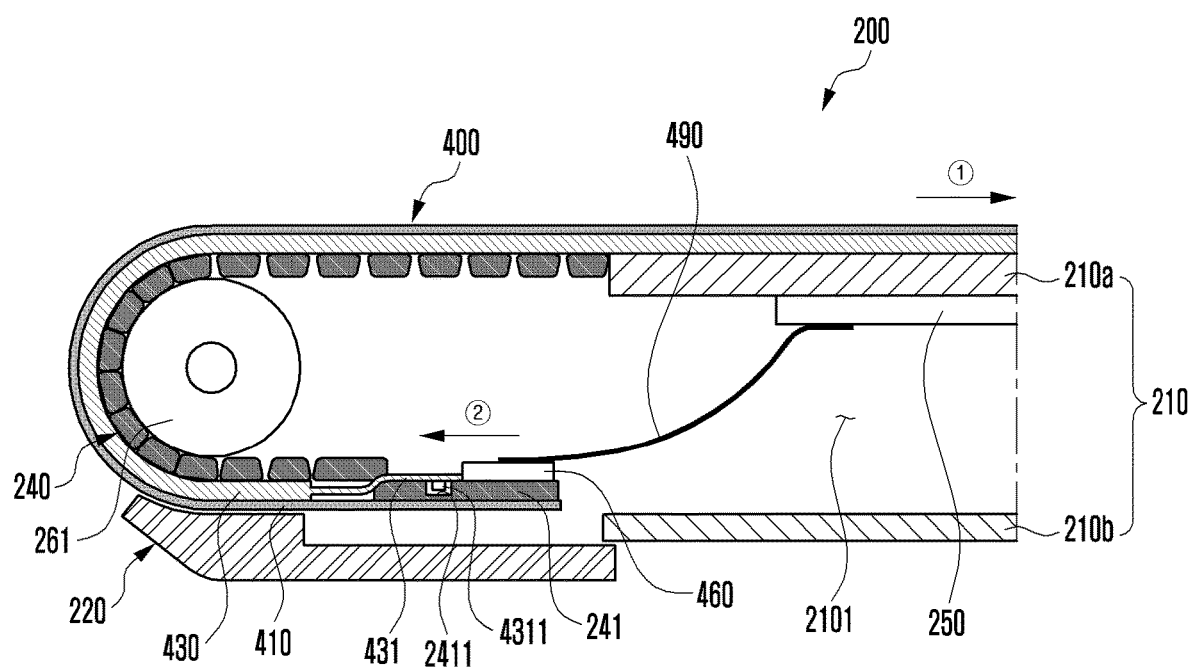

FIGS. 10A and 10B are partial cross-sectional views of an electronic device in a slide-in state and a slide-out state according to certain embodiments of the disclosure.

In the description of the electronic device 200 of FIGS. 10A and 10B, the same reference numerals are assigned to the components substantially the same as those of the electronic device 200 illustrated in FIGS. 5A and 5B, and detailed descriptions thereof may be omitted.

Referring to FIGS. 10A and 10B, at least a portion of the extension 431 extending from the display panel 430 may extend from an end portion of the bendable member 240, and may be disposed to be supported through an extension plate 241 disposed directly on the protection layer 410. For example, at least a portion of the extension 431 may be disposed to at least partially penetrate the extension plate 241. In an embodiment, the extension 431 may be disposed to be fitted into a slit and/or recess (not shown) formed inwardly from one end of the extension plate 241. According to an embodiment, the control circuit 4311 may be arranged to be received in a recess 2411 formed lower (e.g., on a lower plane) than the outer surface (e.g., or "top" surface, via depiction in FIG. 10A) of the extension plate 241. In an embodiment, the display substrate 460 may be disposed on at least a portion of the extension plate 241.

Figure 11:
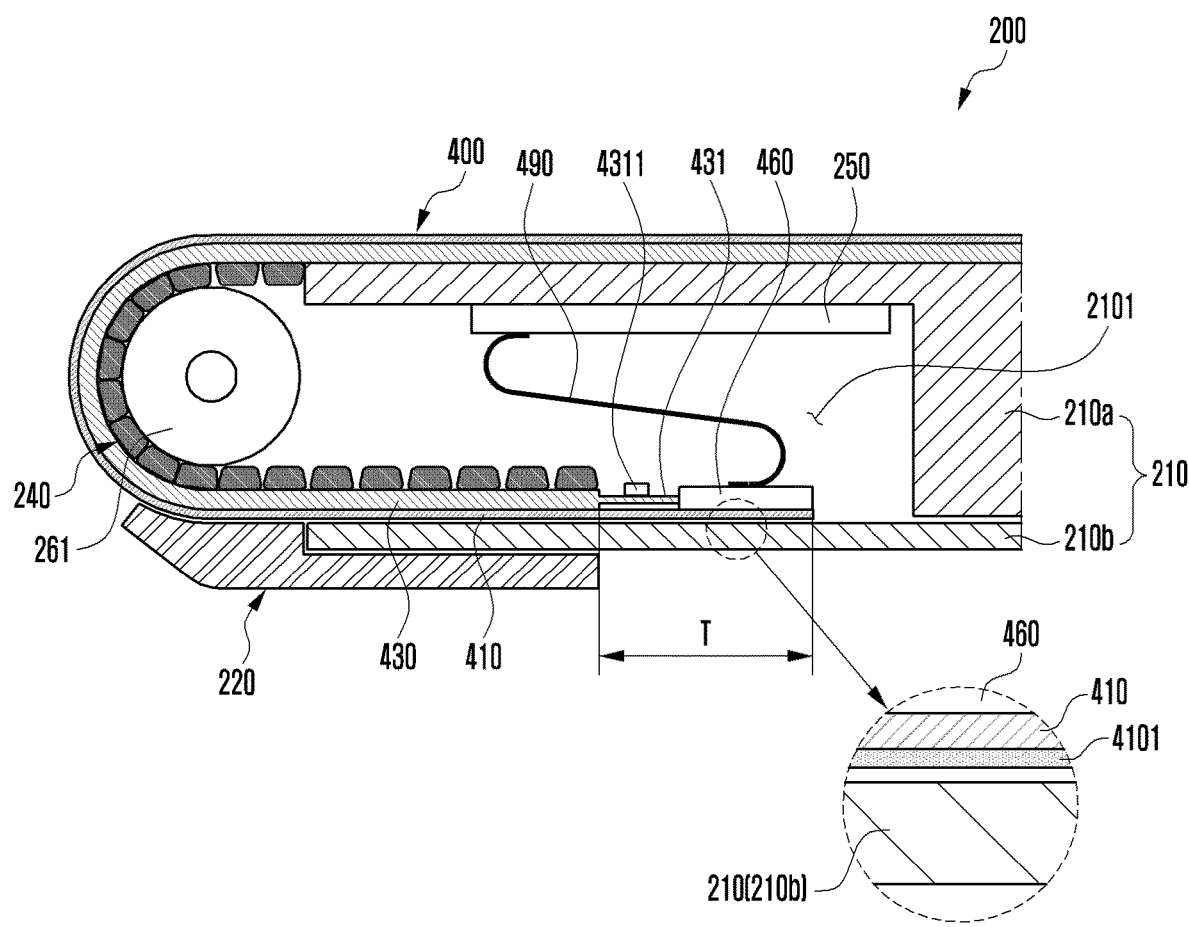
FIG. 11 is a partial cross-sectional view of an electronic device according to certain embodiments of the disclosure.

FIG. 11 is a partial cross-sectional view of an electronic device according to certain embodiments of the disclosure.

In the description of the electronic device 200 of FIG. 11, the same reference numerals are assigned to the components substantially the same as those of the electronic device 200 illustrated in FIGS. 5A and 5B, and detailed descriptions thereof may be omitted.

Referring to FIG. 11, a portion of the protection layer 410, corresponding to a section (T), in which the extension 431 extending from the display panel 430 and the display substrate 460 electrically connected to the extension 431 are arranged, may be disposed such that there is an absence of support from the bendable member 240. According to an embodiment, the portion of the protection layer 410, arranged in the corresponding section (T), may come into contact with the inner surface of the first housing 210, which may generate friction that could damage the protection layer 410, or cause a malfunction of the sliding operation. Accordingly, the protection layer 410 in the corresponding section (T) may include a friction reducing layer 4101 laminated on the outer surface thereof. According to an embodiment, reduced frictional resistance between the protection layer 410 and the inner surface of the first housing 210 through the friction reducing layer 4101 may prevent damage to the protection layer 410. According to an embodiment, the friction reducing layer 4101 may include a Teflon coating layer or a hard coating layer. In an embodiment, the friction reducing layer 4101 may also be disposed on the inner surface of the first housing 210 that the protection layer arranged in the corresponding section (T) faces during the sliding operation. In an embodiment, the friction reducing layer 4101 may be disposed on both the protection layer 410 and the inner surface of the first housing.

According to certain embodiments, the electronic device (e.g., the electronic device 200 of FIG. 5A) may include a first housing (e.g., the first housing 210 of FIG. 5A), a second housing (e.g., the second housing 220 of FIG. 5A) slidably coupled to the first housing, and a flexible display (e.g., the flexible display 400 of FIG. 5A) which includes a first portion (e.g., the first portion 400a of FIG. 2B) at least partially connected to the first housing and visible from the outside in a slide-in state, and a second portion extending from the first portion and at least partially received in an inner space (e.g., the inner space 2101 of FIG. 5A) of the electronic device to be invisible from the outside, and the flexible display may include a protection layer (e.g., the protection layer 410 of FIG. 5A), a display panel (e.g., the display panel 430 of FIG. 5A) laminated on at least a portion of the protection layer, and an extension (e.g., the extension 431 of FIG. 5A) extending, in a region corresponding to the second portion, from the display panel and having a control circuit (e.g., the control circuit 4311 of FIG. 5A) disposed thereon. The extension may be disposed to be supported by the protection layer.

According to certain embodiments, the extension may be disposed on the protection layer corresponding to at least a portion of the second portion.

According to certain embodiments, in a slide-out state, at least a portion of the second portion and the extension may be maintained to be received in the inner space.

According to certain embodiments, the protection layer may include a polymer layer and/or a glass layer.

According to certain embodiments, the protection layer may include a polymer layer and/or a glass layer, and a polarizing layer laminated on the polymer layer and/or the glass layer.

According to certain embodiments, the electronic device may further include a display substrate electrically connected to the extension with the control circuit interposed therebetween.

According to certain embodiments, the display substrate may be attached to the protection layer.

According to certain embodiments, the electronic device may include a support member disposed between the display substrate and the protection layer and configured to support at least a portion of the display substrate.

According to certain embodiments, at least a portion of the extension may be disposed to be supported by the support member.

According to certain embodiments, the control circuit may be disposed on a surface of the extension facing the protection layer and may be received in a recess formed lower than the outer surface of the support member.

According to certain embodiments, the support member may be configured such that guide rails disposed on opposite ends thereof are guided along guide slits disposed in the inner space of the first housing.

According to certain embodiments, the electronic device may further include a main substrate disposed in the inner space, and the main substrate and the display substrate may be electrically connected to each other through a flexible FPCB.

According to certain embodiments, the display substrate may include a protruding region which does not overlap the structure, and the flexible FPCB may be electrically connected to the protruding region of the display substrate while being disposed between the display substrate and the protection layer.

According to certain embodiments, the electronic device may further include a bendable member connected to be movable together with the first housing, and at least a portion of the first portion and at least a portion of the second portion may be arranged to be supported by the bendable member.

According to certain embodiments, the bendable member may further include an extension plate extending from an end portion thereof and disposed on the protection layer, and the extension may penetrate at least a portion of the extension plate to be fixed to the extension plate.

According to certain embodiments, the electronic device may further include a display substrate which is electrically connected to the extension with the control circuit interposed therebetween and is fixed to the extension plate.

According to certain embodiments, the control circuit may be disposed on a surface of the extension facing the protection layer, and the extension plate may include a recess for receiving the control circuit.

According to certain embodiments, the flexible display (e.g., the flexible display 400 of FIG. 5A) may include a protection layer (e.g., the protection layer 410 of FIG. 5A), a display panel (e.g., the display panel 430 of FIG. 5A) laminated on at least a portion of the protection layer, and an extension (e.g., the extension 431 of FIG. 5A) extending from the display panel and having a control circuit (e.g., the control circuit 4311 of FIG. 5A) disposed thereon, and the extension may be disposed to be supported by the protection layer.

According to certain embodiments, the protection layer may include a polymer layer and/or a glass layer.

According to certain embodiments, the electronic device may further include a display substrate electrically connected to the extension with the control circuit interposed therebetween, and a main substrate disposed in the inner space, and the main substrate and the display substrate may be electrically connected to each other through a flexible FPCB.

The embodiments disclosed in the specification and drawings are merely provided for specific examples to easily explain the technical content according to the embodiments of the disclosure and help the understanding of the embodiments of the disclosure, and are not intended to limit the embodiments of the disclosure. Therefore, the embodiments of the disclosure should be construed that all changes or modified forms derived based on the technical idea of certain embodiments of the disclosure in addition to the embodiments disclosed herein are included in embodiments of the disclosure.

The invention claimed is:

1. An electronic device, comprising: a first housing defining an inner space; a second housing slidably coupled to the first housing; a flexible display including a first portion at least partially disposed at the first housing and visible from an exterior of the electronic device when disposed in a retracted state and a second portion extending from the first portion and at least partially retracted into the inner space so as to be invisible from the exterior, the flexible display including: a protection layer, a display panel laminated on at least a portion of the protection layer, an extension extending from the display panel, the extension disposed in a region corresponding to the second portion, having a control circuit disposed thereon, and disposed to be supported by the protection layer; a display substrate electrically connected to the extension, with the control circuit interposed therebetween; and a support member disposed between the display substrate and the protection layer, the support member configured to support at least a portion of the display substrate.

2. The electronic device of claim 1, wherein the extension is disposed on the protection layer, corresponding to at least a part of the second portion.

3. The electronic device of claim 2, wherein, in an extended state, at least the part of the second portion and the extension are disposed in the inner space.

4. The electronic device of claim 1, wherein the protection layer comprises a polymer layer and/or a glass layer.

5. The electronic device of claim 1, wherein the protection layer comprises:
a polymer layer and/or a glass layer, and
a polarizing layer laminated on the polymer layer and/or the glass layer.

6. The electronic device of claim 1, wherein the display substrate is attached to the protection layer.

7. The electronic device of claim 1, wherein at least a portion of the extension is disposed so as to be supported by the support member.

8. The electronic device of claim 7, wherein the control circuit is disposed on a surface of the extension facing the protection layer, and is disposed at least partly within a recess formed in the support member.

9. The electronic device of claim 1, wherein the support member includes guide rails that are disposed on opposite ends thereof, and
wherein the guide rails are guided along guide slits disposed in the inner space of the first housing.

10. The electronic device of claim 1, further comprising a main substrate disposed in the inner space,
wherein the display substrate is electrically connected to the main substrate through a flexible printed circuit board (FPCB).

11. The electronic device of claim 1, further including a bendable member coupled to and movable together with the first housing,
wherein at least a part of the first portion and at least a part of the second portion are supported by the bendable member.

* * * * *